May 5, 1953     J. S. BURGE ET AL     2,637,798
APPARATUS FOR WELDING A TERMINAL CLIP TO A WIRE
Original Filed July 29, 1946     13 Sheets-Sheet 1
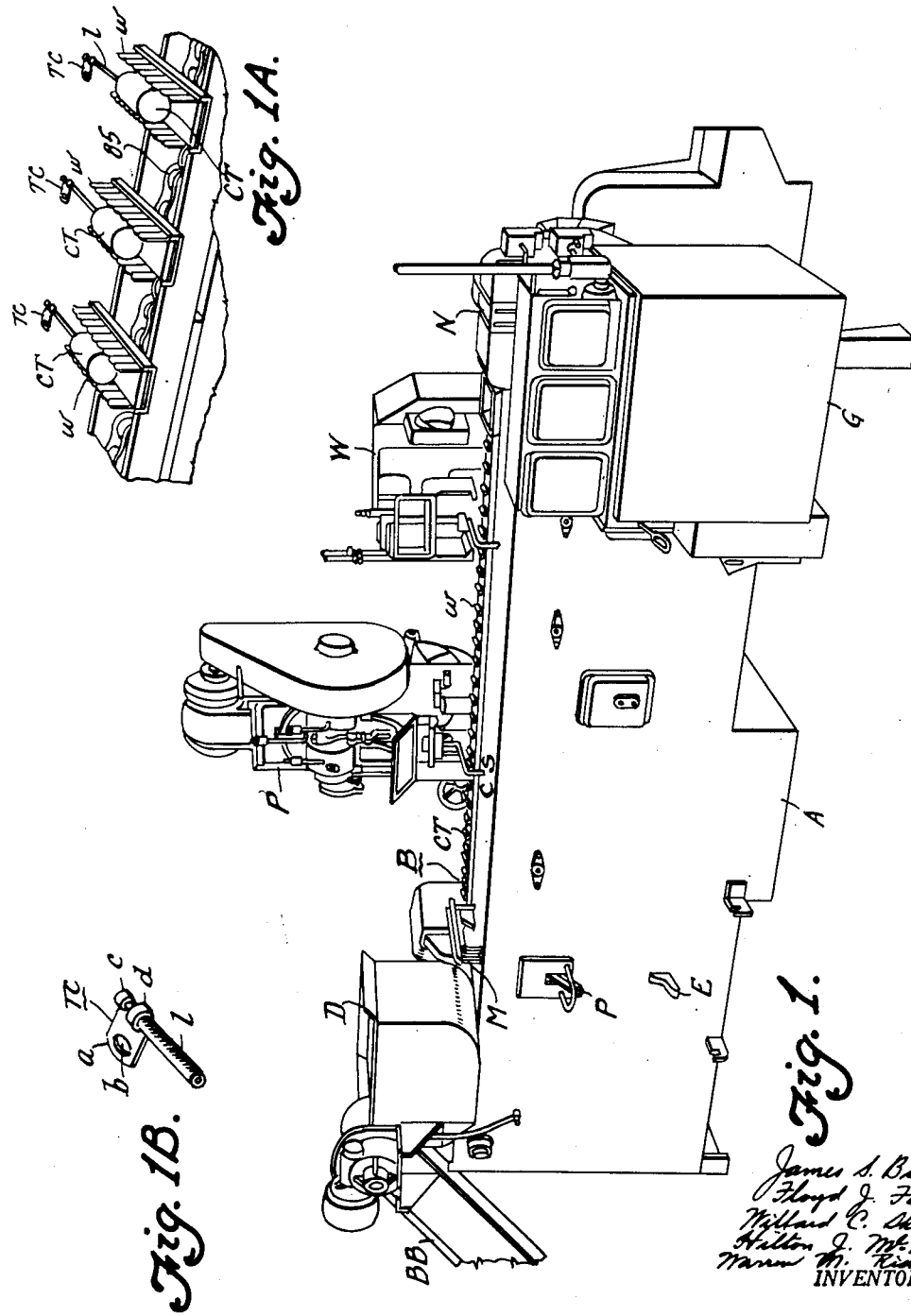

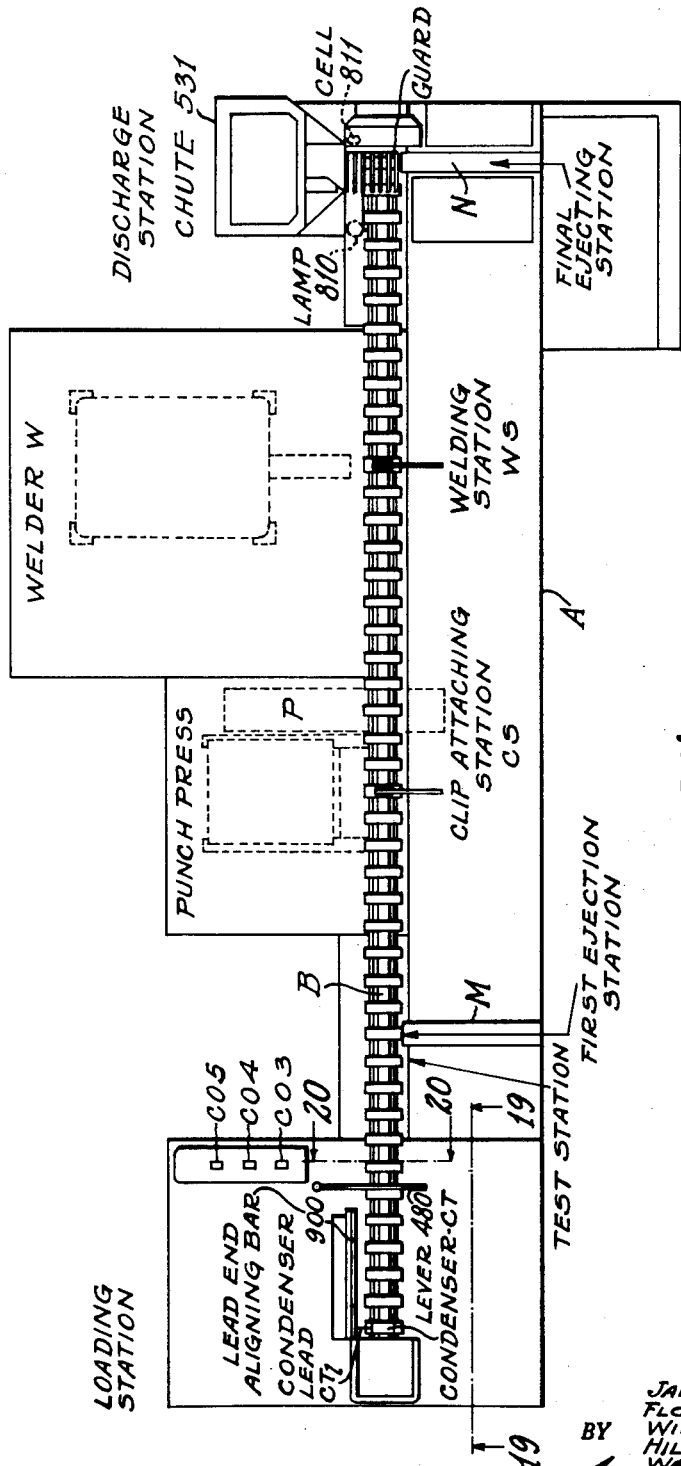

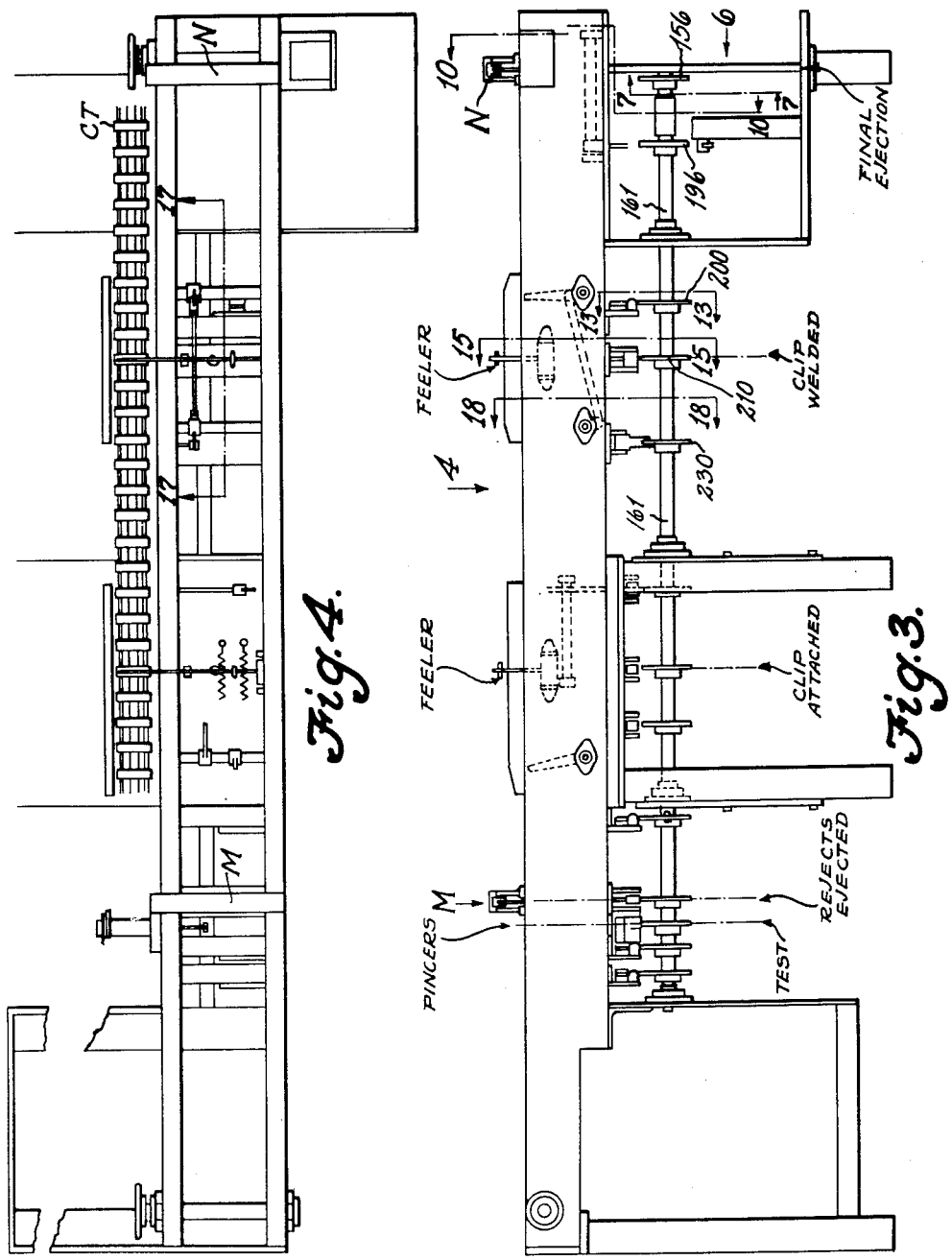

May 5, 1953 J. S. BURGE ET AL 2,637,798
APPARATUS FOR WELDING A TERMINAL CLIP TO A WIRE
Original Filed July 29, 1946 13 Sheets-Sheet 4

INVENTOR.
JAMES S. BURGE
FLOYD J. FOUST
BY WILLARD C. SHAW
HILTON J. McKEE
WARREN M. RIDER

ATTORNEYS

May 5, 1953 J. S. BURGE ET AL 2,637,798
APPARATUS FOR WELDING A TERMINAL CLIP TO A WIRE
Original Filed July 29, 1946 13 Sheets-Sheet 6

INVENTOR.
JAMES S. BURGE
FLOYD J. FOUST
BY WILLARD C. SHAW
HILTON J. McKEE
WARREN M. RIDER
ATTORNEYS

May 5, 1953 J. S. BURGE ET AL 2,637,798
APPARATUS FOR WELDING A TERMINAL CLIP TO A WIRE
Original Filed July 29, 1946 13 Sheets-Sheet 7

INVENTORS
JAMES S. BURGE
FLOYD J. FOUST
WILLARD C. SHAW
HILTON J. McKEE
WARREN M. RIDER
BY
ATTORNEYS

May 5, 1953   J. S. BURGE ET AL   2,637,798
APPARATUS FOR WELDING A TERMINAL CLIP TO A WIRE
Original Filed July 29, 1946   13 Sheets-Sheet 8
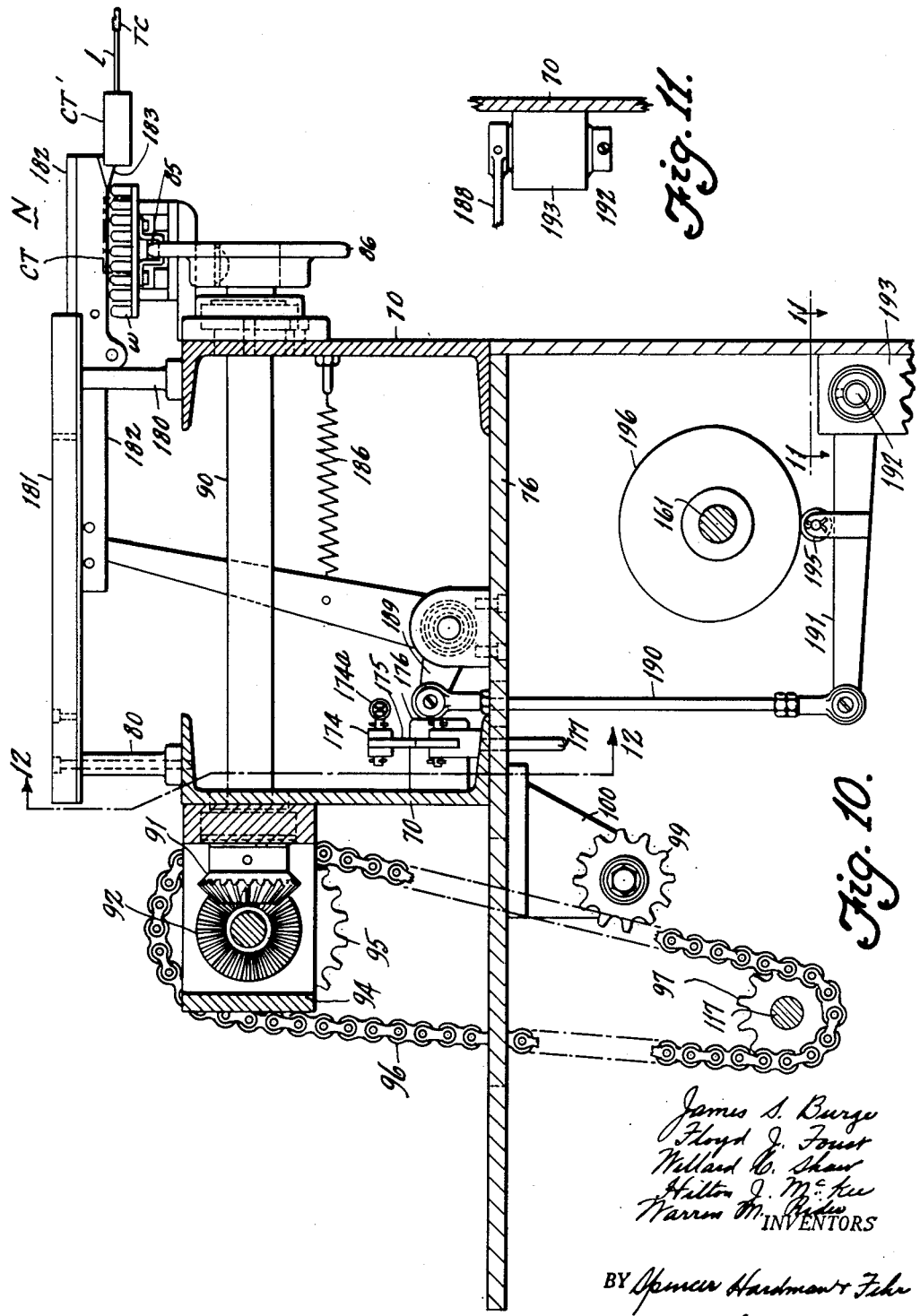

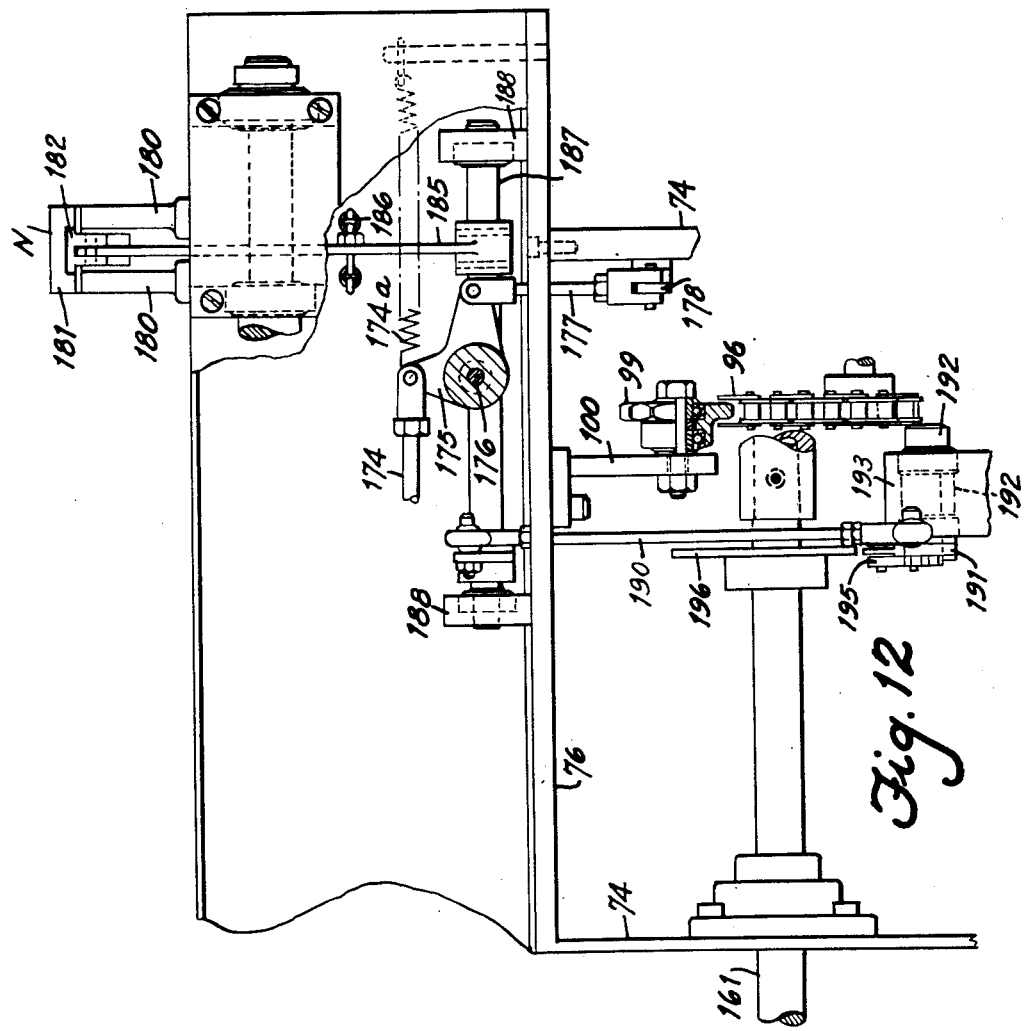

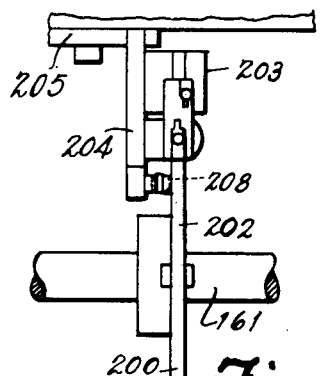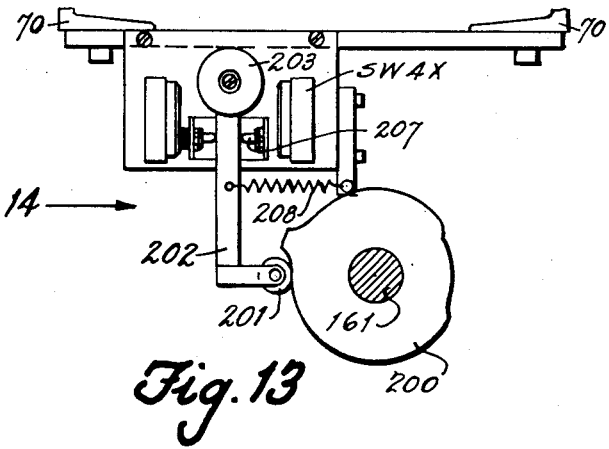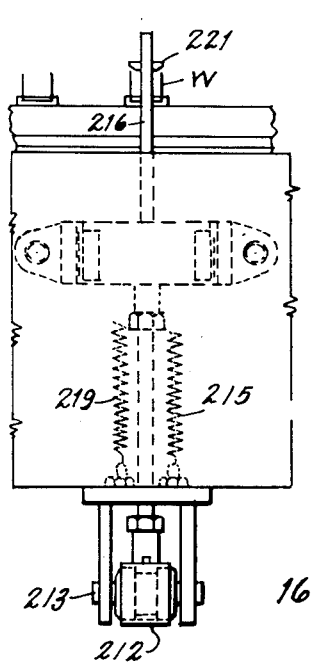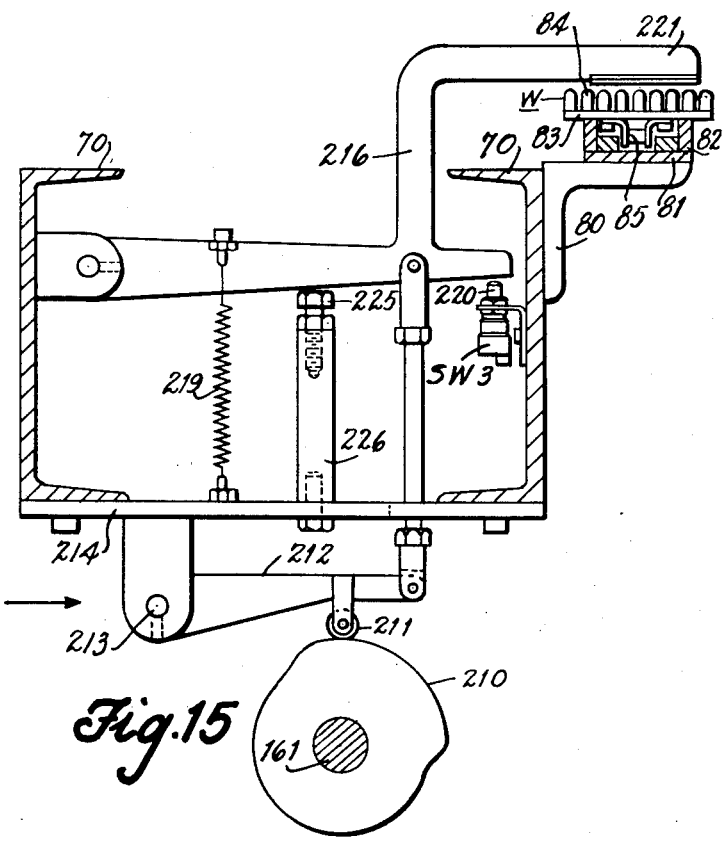

May 5, 1953  J. S. BURGE ET AL  2,637,798
APPARATUS FOR WELDING A TERMINAL CLIP TO A WIRE
Original Filed July 29, 1946  13 Sheets-Sheet 11
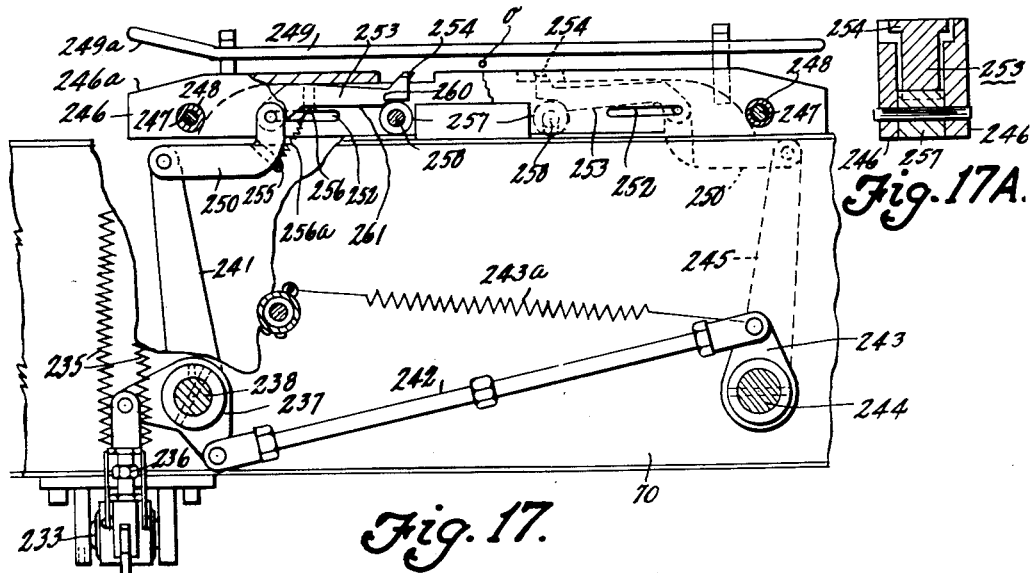
Fig. 17A.
Fig. 17.
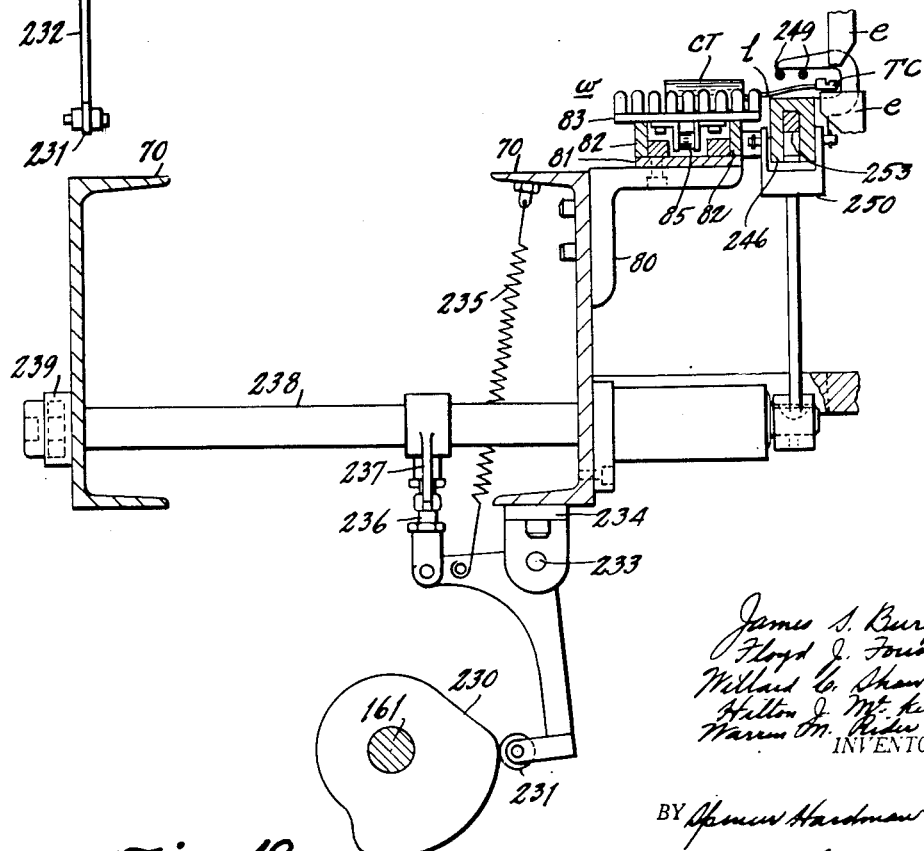
Fig. 18.
James S. Burge
Floyd J. Foust
Willard C. Shaw
Hilton J. McKee
Warren M. Rider
INVENTORS
BY James Hardman & Fehr
their attorneys

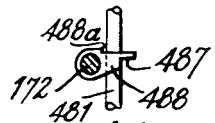
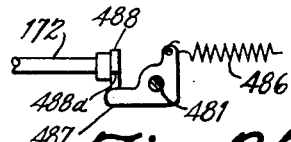
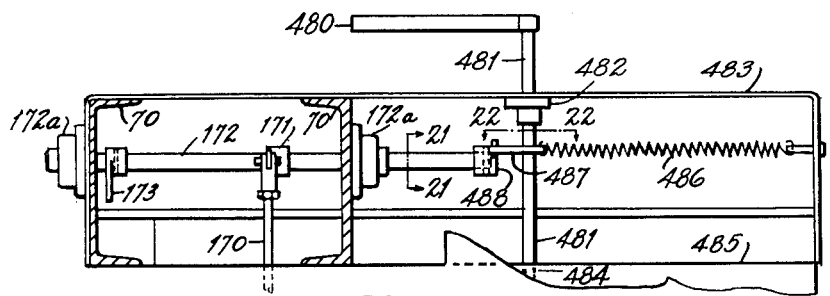
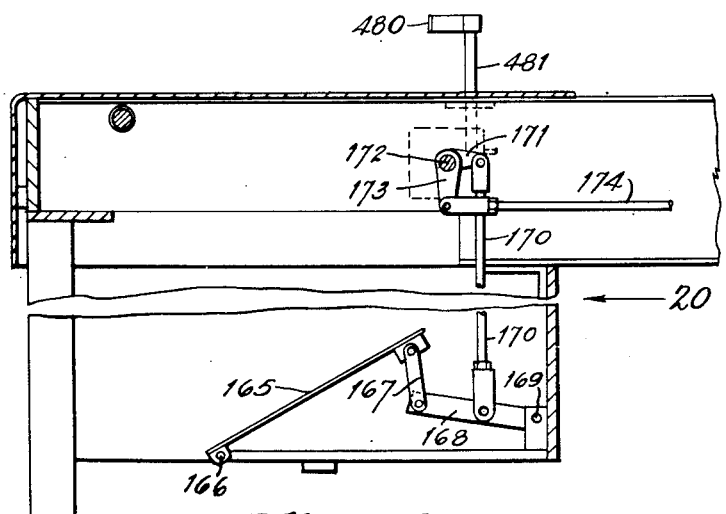

Patented May 5, 1953

2,637,798

UNITED STATES PATENT OFFICE 2,637,798

APPARATUS FOR WELDING A TERMINAL CLIP TO A WIRE

James S. Burge, Floyd J. Foust, Willard C. Shaw, and Warren M. Rider, Anderson, and Hilton J. McKee, Middletown, Ind., assignors to General Motors Corporation, Detroit, Mich., a corporation of Delaware Original application July 29, 1946, Serial No. 686,964, now Patent No. 2,596,396, dated May 13, 1952. Divided and this application May 24, 1950, Serial No. 163,962

2 Claims. (Cl. 219—4)

This application is a division of our copending application, Serial No. 686,964, filed July 29, 1946, now U. S. Patent 2,596,396 granted May 13, 1952.

This invention relates to the manufacture of electrical condensers and more particularly to condenser having a foil winding enclosed in a metal can to which one foil is electrically connected to a wire extending from the can and insulated therefrom.

An object of the invention claimed in this application is to facilitate the welding of a terminal clip to the wire which the machine forms and attaches to the wire. To accomplish this object, the disclosed embodiment of the invention provides an intermittently operating conveyor having workholders for receiving the condensers, a punch press for forming a terminal clip and attaching it to a condenser wire when the condenser has been conveyed to the clip-attaching station and an electric welding apparatus which applies electrodes to the clip and wire and causes a welding current to pass when the condenser has been conveyed to the clip-welding station. After the welding operation, the completed condensers are ejected from the conveyor. The machine provides means for operating the conveyor, welding apparatus and ejector in timed relation.

Further objects and advantages of the present invention will be apparent from the following description, reference being had to the accompanying drawings, wherein a preferred embodiment of the present invention is clearly shown.

In the drawings:

Fig. 1 is a front perspective view of the machine.

Fig. 1A is a fragmentary perspective view of a portion of the machine conveyor and work holders supporting condensers.

Fig. 1B, drawn to a larger scale than Fig. 1A, is a fragmentary perspective view showing a condenser lead wire and terminal clip attached thereto.

Fig. 2 is a diagrammatic plan of the machine.

Fig. 3 is a mechanism diagram of the machine.

Fig. 4 is a view in the direction of arrow 4 of Fig. 3.

Figure 5:
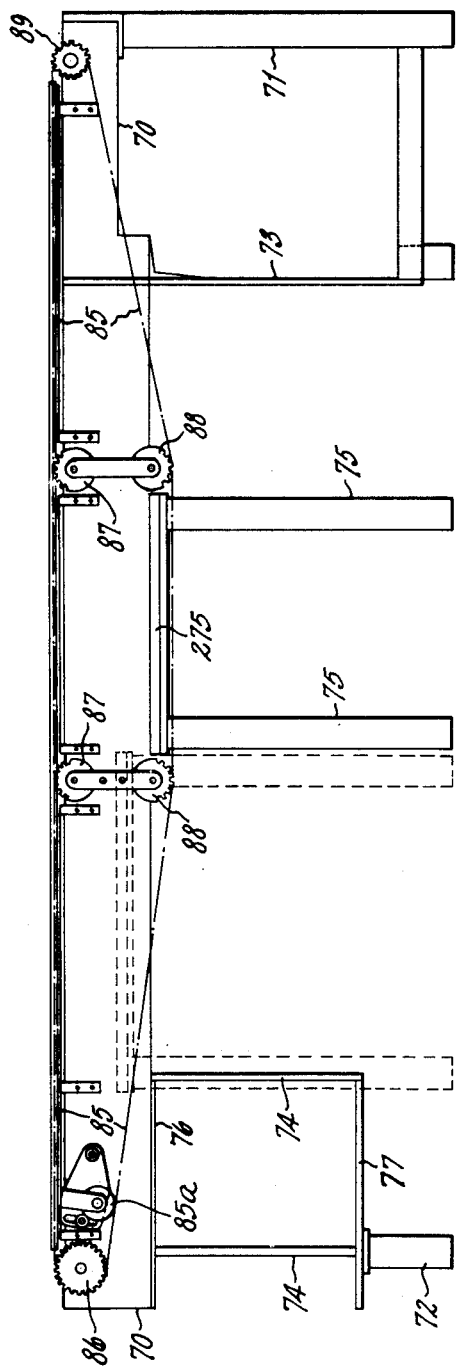

Fig. 5 is a rear elevation of the table and conveyor.

Figure 6:
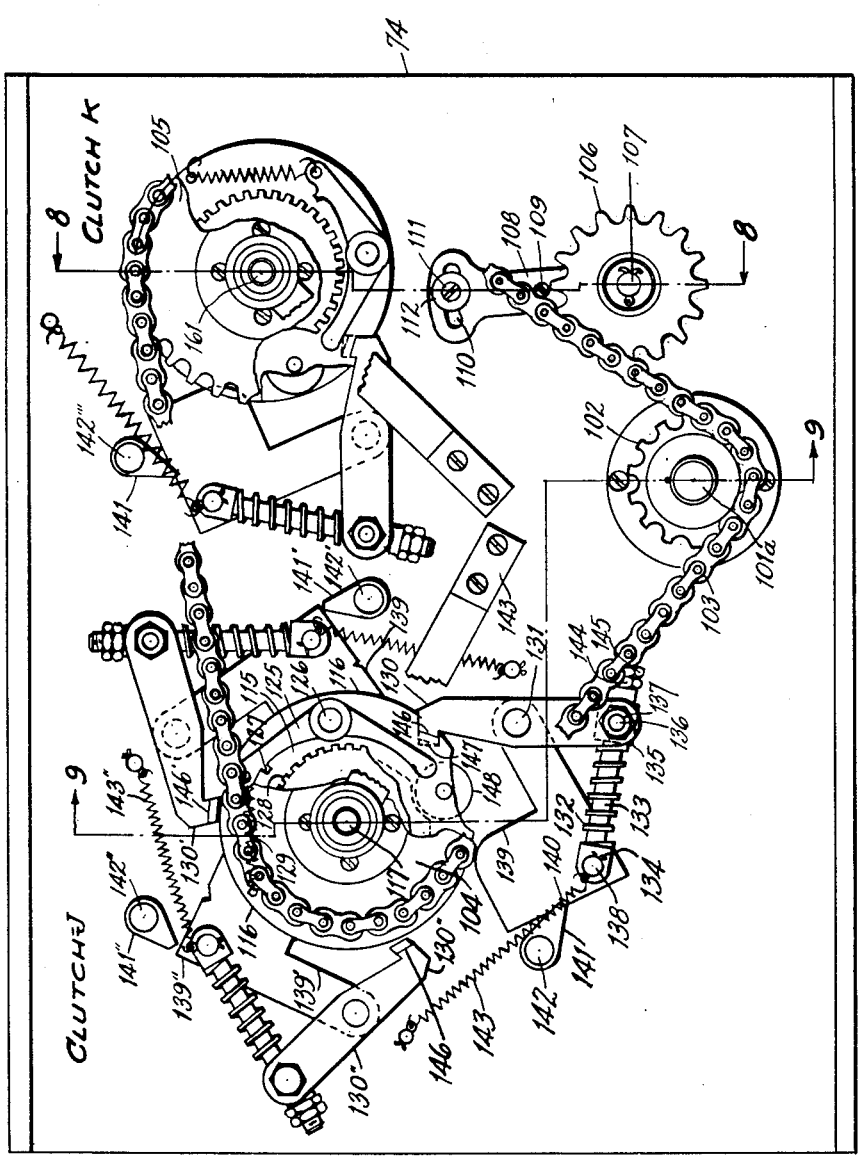

Fig. 6 is a view of a mechanism in the direction of arrow 6 of Fig. 3.

Figure 7:
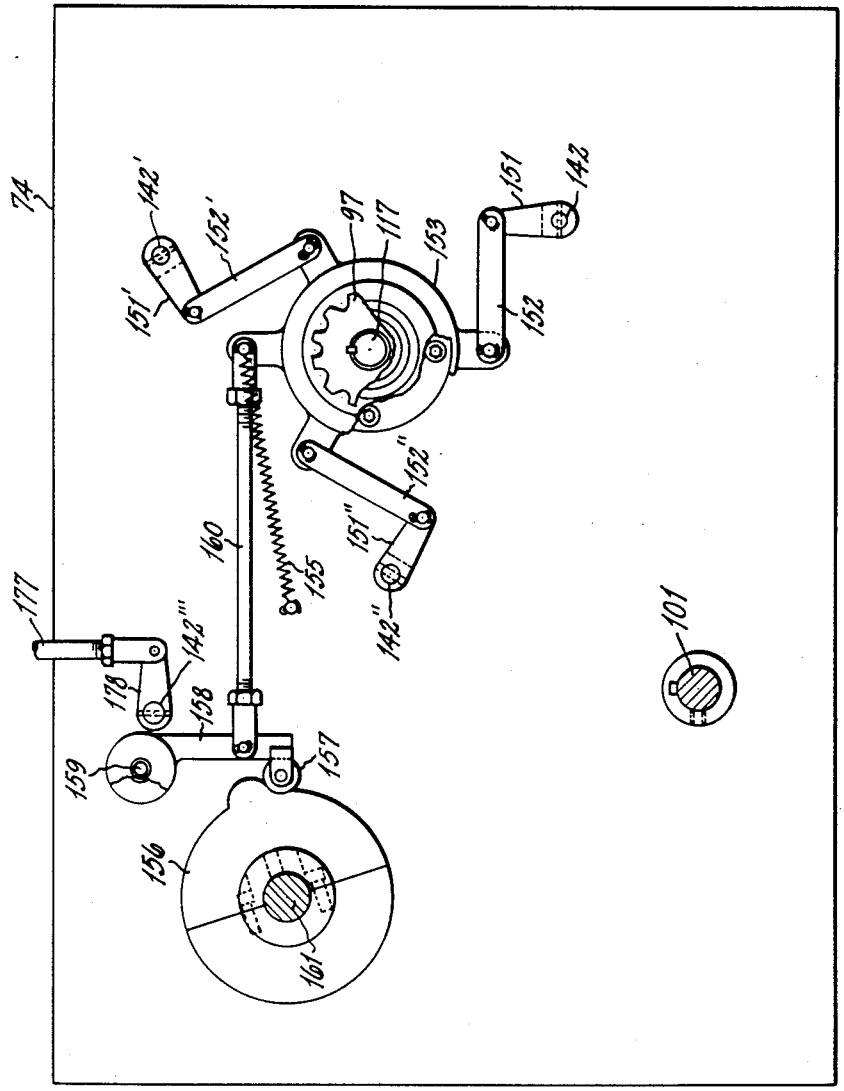

Fig. 7 is a sectional view on line 7—7 of Fig. 3.

Figure 8:
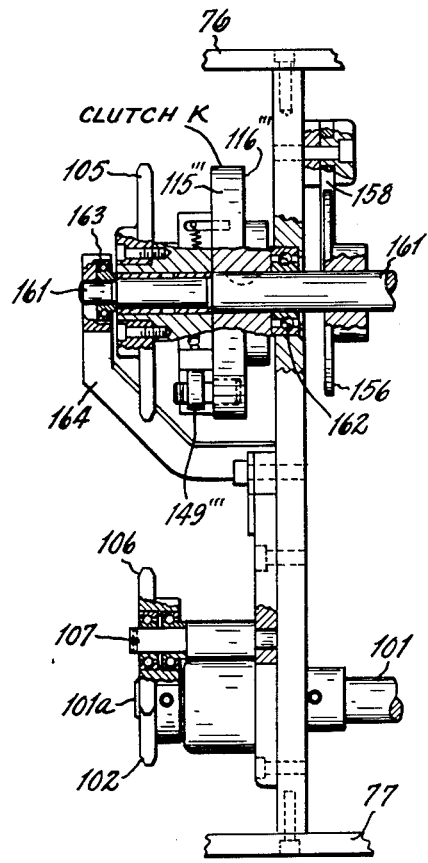

Fig. 8 is a sectional view on line 8—8 of Fig. 6.

Figure 9:
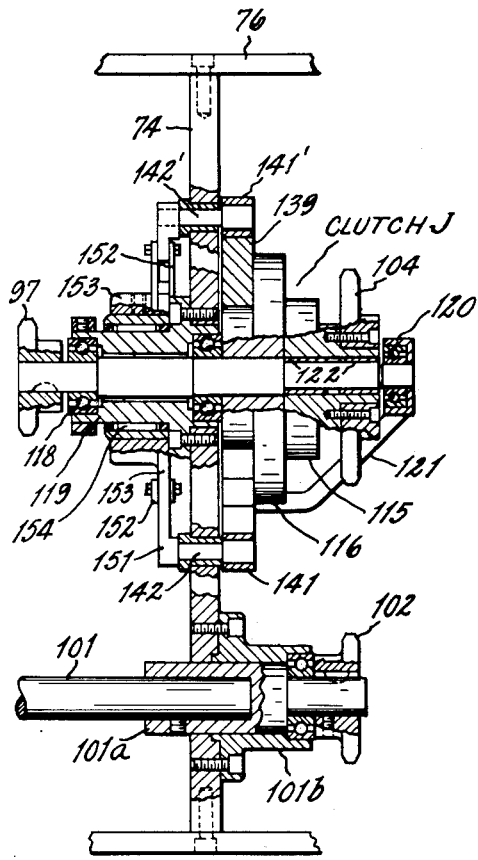

Fig. 9 is a sectional view on line 9—9 of Fig. 6.

Fig. 10 is a sectional view on line 10—10 of Fig. 3.

Fig. 11 is a fragmentary view on line 11—11 of Fig. 10.

Fig. 12 is a sectional view on line 12—12 of Fig. 10.

Fig. 13 is a sectional view on line 13—13 of Fig. 3.

Fig. 14 is a view in the direction of arrow 14 of Fig. 13.

Fig. 15 is a sectional view on line 15—15 of Fig. 3.

Fig. 16 is a view in the direction of arrow 16 of Fig. 15.

Fig. 17 is a sectional view on line 17—17 of Fig. 4.

Fig. 17A is a sectional view on the line 17A—17A of Fig. 17.

Fig. 18 is a sectional view on line 18—18 of Fig. 3.

Fig. 19 is a sectional view on line 19—19 of Fig. 2.

Fig. 20 is a sectional view on line 20—20 of Fig. 2.

Figs. 21 and 22 are sectional views on lines 21—21 and 22—22, respectively, of Fig. 20.

Figure 23:
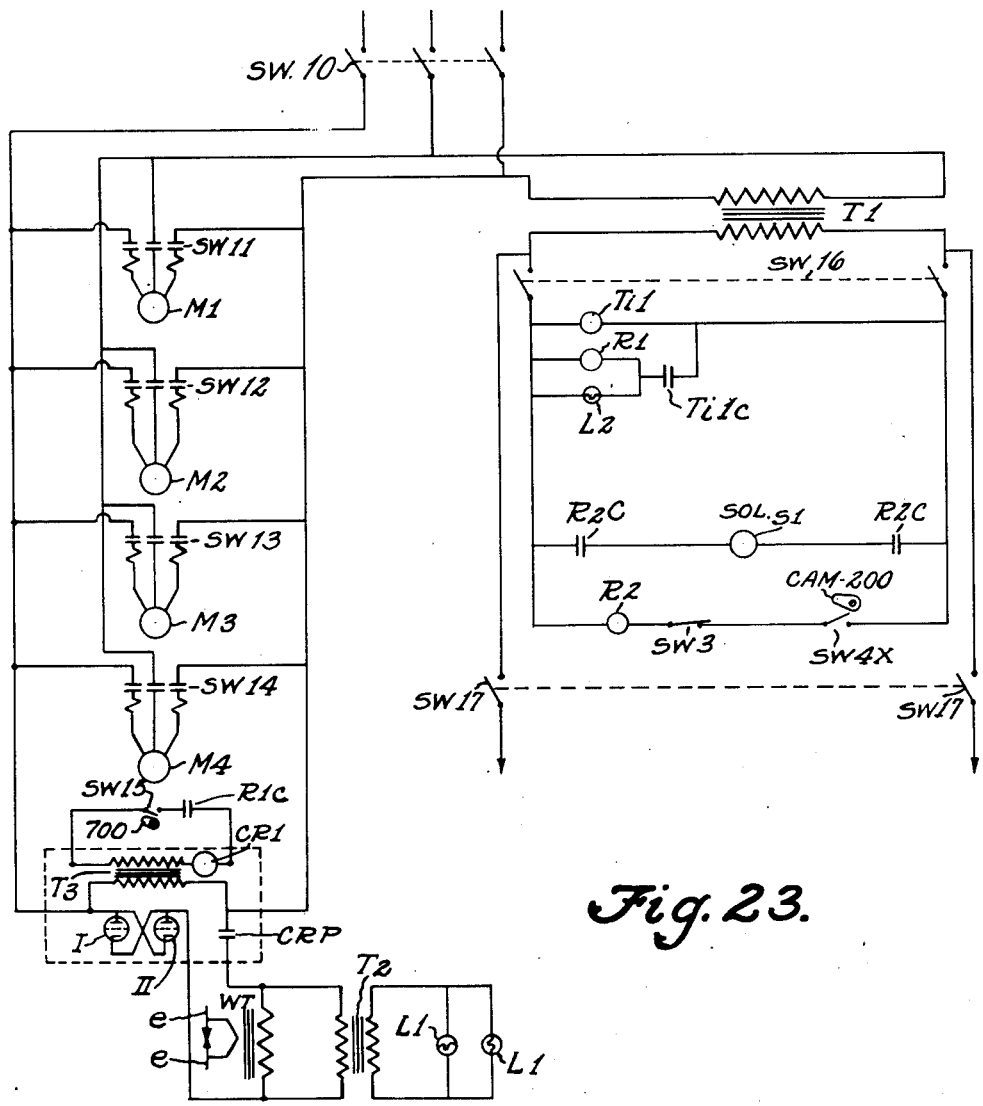

Fig. 23 is a wiring diagram of electrical controls of the welder.

Referring to Figs. 1 and 2, the machine comprises a cabinet A which supports a conveyor B carrying workholders $w$ each for receiving a condenser CT. A conveyor BB conveys the condensers from a machine for assembling condensers to a hopper D, the bottom of which is open so that the operator may reach in and place the condensers upon the workholders $w$ moved by the conveyor B as shown in Fig. 1A. As the condensers pass right in Fig. 1 on the conveyor, the terminal wire of the condenser is automatically connected with the testing apparatus which has a ground connection through the machine on which the can of the condenser is grounded in the cabinet. Those condensers which fail to pass the tests are automatically ejected by ejector M and are caused to pass down chutes E and F, respectively, for the discharging of condensers which fail to pass the capacity test or fail on account of short-circuiting or on account of failure to discharge properly. These condensers which pass the test remain on the conveyor which carries them first to a clip-attaching station CS where a terminal clip is attached to the condenser wire. The terminal clips are made by a die operated by a punch press P. The terminal clip TC (Fig. 1B) includes a flat portion $a$ having a screw receiving hole $b$ and tangs $c$ and $d$ which the punch press bends respectively around the bare portion of lead wire $l$ and the insulated portion thereof. Then the condensers pass to a welding station WS where the clip is welded to the terminal wire by an electric welder W. Welder W welds the tang $c$ to the bare portion of the lead wire $l$. At the right end of the cabinet the condensers are ejected by ejector N (Figs. 1-3).

Referring to Fig. 5, the sheet metal exterior of the cabinet as shown in Fig. 1 is supported by a frame comprising two horizontal channel bars 70 supported above the floor by legs 71 and 72 and plates 73, 74, 76 and 77 by a table 75 which supports also the punch press P. As shown in Fig. 15, a channel 70 supports angle bars 80 supporting a plate 81 which supports rails 82 which support the work-holders $w$ comprising a plate 83 slidable along the rails and carrying resilient, condenser retainers 84. The workholders $w$ are attached to links of a conveyor chain 85 which as shown in Fig. 5, passes around a drive sprocket 86, a slack take-up sprocket 85a, upper idle sprockets 87, lower idle sprockets 88 and an end idle sprocket 89, all of these sprockets being supported by a channel bar 70. Referring to Fig. 10, sprocket 86 is supported by a shaft 90 journaled in bearings supported by the channels 70. To the shaft 90 there is attached a bevel gear 91 meshing with a bevel gear 92 connected with a shaft 93 supported by a bracket 94 attached to a bar 70. Shaft 93 is connected with a sprocket 95 connected by a chain 96 with a sprocket 97 attached to a shaft 117. Chain 96 passes around an idle sprocket 99 supported by a bracket 100 supported by plate 76.

The cabinet G in the front of right end of cabinet A (Fig. 1) houses an electric motor, not shown, which is operatively connected in any suitable manner with a shaft 101 connected with a shaft 101a journaled in a bearing 101b supported by plate 74 (Fig. 9) and connected with a sprocket 102 (also Fig. 6). A chain 103 passes around sprocket 102 and sprockets 104 and 105 and is engaged by an idle sprocket 106 pivotally supported at 107 by a lever 108 pivoted at 109 having a slot 110 through which passes a clamp screw 111 threaded into the plate 74. Lever 108 is adjusted to take up the slack in chain 103 and it is held in adjusted position by tightening the screw 111 which passes through a clamp washer 112.

Referring to Figs. 6 and 9, sprocket 104 is attached to the hub of a clutch driving member 115 of a one-third revolution clutch J having a driven member 116 keyed to the shaft 117, journaled in bearings 118 supported by a bushing 119 attached to plate 74. Shaft 117 carries the conveyor drive sprocket 97 (Fig. 10). Shaft 117 is journaled in a bearing 120 carried by a bracket 121 supported by plate 74. The hub of the clutch driving member 115 is fitted with bearings 122 which are journaled on the shaft 117.

Referring to Fig. 6, clutch driving member 115 is connected with clutch driven member 116 by lever 125 pivoted at 126 on member 116 and having a tooth 127 for engaging a notch 128 of the driving member 115. When the lever 125 is released for counterclockwise motion about its pivot 126, a spring 129, connecting lever 125 with member 116, causes the lever to connect the clutch members. Lever 125 is prevented from engaging its tooth 127 with a notch 128 by a lever 130 pivoted at 131 upon the plate 74 and urged counterclockwise by a spring 132 which surrounds a rod 133 and which is confined between the eye head 134 of the rod and a block 135 having a screw 136 pivoted on lever 130 and retained by a nut 137. The head 134 is pivoted at 138 on a lever 139 pivoted also on 131. Lever 139 has a notch 140 for receiving a latch pawl 141 attached to a shaft 142 which retains the lever 139 in the position shown against the action of a spring 143 connecting said lever with the plate 74. The right end of rod 133 is threaded to receive a nut 144 which, as shown in Fig. 6, is spaced slightly from the right side of the block 135. Nut 144 is locked in adjusted position by a lock nut 145. Lever 130 has a hook 146 for engaging a notch 147 in member 116. Member 116 supports a pivoted roller 148. To trip the clutch, the latch 141 is retracted by clockwise rotation of shaft 142 and the spring 143 pulls the lever 139 clockwise. Rod 133 moves left carrying with it the nut 144 which pulls on the block 135 and causes the lever 130 to move clockwise to pull the hook 146 out of the notch 147 and thereby allowing the lever 125 to move counterclockwise by the action of spring 129. The clutch members 115 and 116 are then connected and 116 will rotate counterclockwise. If there were but one set of parts numbered 130 through 146, the member 116 would turn one revolution. Toward the end of this movement the roller 148 engages the lever 139 to move it counterclockwise against the action of spring 143 and to cause, through the action of the spring 132, the lever 130 to be forced counterclockwise against the periphery of member 116. Before the end of the one-revolution the pawl 141 is permitted to return by spring to be described to a latching position wherein the lever 139 will be latched as shown in Fig. 6, after the roller 148 passes to the right of it. Therefore, at the end of one revolution, the lever hook 146 will snap into the notch 147 to retain the plate 116 coincidentally with the retraction of the lever tooth 127 from a notch 128 of driving member 115. In order to obtain a partial revolution of the clutch before it is automatically thrown out, for example, one-third revolution, three sets of members, numbered 130 through 146, are provided and the parts of these sets are similar to those described marked with the same reference numerals. The numerals applying to one set have a prime affixed and the numerals applying to the other set have a double prime affixed. It will be seen that the locking levers 130, 139' and 130" are spaced equi-angularly about the driving member 115. If lever 139 is the first to be tripped, the clutch will rotate counterclockwise one-third revolution and roller 148 will pass under lever 139' to lift it so that it can be retained by lever 139' and will be caught by the latch 141' and the clutch member 116 will be stopped by the engagement with its notch 147 by the hook 146' of lever 130. For the next one-third revolution, the latch 141' is retracted so as to allow the clutch members to be connected for another one-third revolution, during which the roller 148 will engage the lever 139" which will result in the engagement by the member 116 with the hook 146" of lever 130".

The three latches 141, 141' and 141" are connected by shafts 142, 142' and 142", respectively, which, as shown in Fig. 7, are attached to levers 151, 151' and 151" connected by links 152, 152' and 152" with a plate 153 which, as shown in Fig. 9, is journaled on roller bearings 154 supported by the bushing 119. Plate 153 is urged by a spring 155 counterclockwise so that the shafts 142, 142' and 142" are urged clockwise in Fig. 7 or counterclockwise in Fig. 6 so as to urge the latching pawls into latching position. Plate 153 is rotated clockwise by a cam 156 engageable with a roller 57 carried by a lever 158 pivoted at 159 and connected with lever 153 by a link 160. Cam 158 is driven by a cam shaft 161 which, as shown in Fig. 8, is journaled in a bearing 162 supported by plate 74 and a bearing 163 supported by a bracket 164 attached to plate 74. Sprocket 105 which is journaled loosely on the shaft 161, is connected therewith through a one-revolution clutch K of the same construction as the clutch J except that there is only one set of parts like those numbered 130 through 146. The parts of clutch K which are like those of clutch J are indicated by the same numerals but with a triple prime affixed. The latch pawl 141''' attached to shaft 142''' is controlled by a pedal 165 (Fig. 19) pivoted at 166 connected by a link 167 with a lever 168 pivoted at 169 connected by a link 170 with a lever 171 attached to a shaft 172 connected with a lever 173 connected by a link 174 (Fig. 12) with a lever 175 pivoted at 176 and connected by a link 177 with a lever 178 (see also Fig. 7), connected with shaft 142'''. Therefore, by depressing the pedal 165, the clutch K will be continuously tripped and cam shaft 161 will continuously rotate. Each time shaft 161 makes one revolution, clutch J is tripped but it automatically throws out at the end of one-third revolution so that the conveyor will be driven intermittently while the cam shaft rotates continuously until pedal 165 is released.

Figs. 19 and 20 show a bar 480 mounted on the upper end of a shaft 481 which is supported in a bearing 482 attached to a cover plate 483 and in a bearing 484 provided by a plate 485. The bar 480 is held in a normal position by a spring 486 attached to the cover 483 and to a lever 487 attached to the shaft 481. Spring 486 urges lever 487 against a lever 488 on shaft 172. When pedal 165 is depressed, lever 488 on shaft 172 moves down (Fig. 21) and allows lever 487 on shaft 481 to move left (Fig. 21) or up, (Fig. 22), by the action of spring 486 until the lever 487 strikes shoulder 488a of lever 488. This causes the pedal 165 to be held in depressed position so that the machine will operate until the operator at the left end of the machine moves the stopping lever 480 attached to shaft 481. So long as the pedal 165 is held down, the cam shaft 161 will turn one revolution and then stop; and while the cam shaft 161 is at rest, the conveyor B moves the workholders w a distance equal to the spacing of the workholders.

Fig. 10, which is a sectional view on line 10—10 of Fig. 3, shows ejector N for ejecting the completed condensers from the conveyor workholder. Posts 180 supported by channels 70 support rails 181 for a slide 182 having a condenser can pusher 183. Bar 182 is operated by a lever 185 urged clockwise (Fig. 10) by spring 186 and attached to a shaft 187 journaled on brackets 188 (Fig. 12) and carrying a lever 189 connected by link 190 with a lever 191 attached to a shaft 192 journaled in a bracket 193 (Figs. 11 and 12). Lever 191 carries a roller 195 for engaging a cam 196 driven by shaft 161. While the portion of cam 196 of greatest radius engages the roller 195, the pusher 183 is located at the left of the condenser CT then in the workholder w as indicated by dot-dash lines. During rotation of cam 196, the pusher 183 moves right into the position shown in Fig. 10, to move the condenser from position CT in the workholder w to position CT' clear of the workholder to permit the condenser to gravitate from the workholder.

Fig. 13 which is a sectional view on line 13—13 of Fig. 4 shows a cam 200 mounted on shaft 161 and engageable with a roller 201 carried by a lever 202 pivoted at 203 on a plate 204 attached to a plate 205 supported by channels 70. Plate 204 carries a welder control switch SW4X having a plunger 207. A spring 208 urges the lever 202 against plunger 207 to operate switch SW4X when the cam 200 permits it.

Fig. 15 which is a sectional view on line 15—15 of Fig. 3, shows a cam 210 for engaging a roller 211 carried by a lever 212 pivoted at 213 upon a plate 214 supported by the channels 70 and connected by a link 215 with a lever 216 pivoted at 217 on a bracket 218 supported by a channel 70 and urged clockwise by a spring 219. Lever 216 is engageable with the plunger 220 of a normally closed switch SW3. If, at the time cam 200 (Fig. 13) allows spring 208 to close switch SW4X, switch SW3 is closed, the welder W will operate. The lever 216 carries a feeler bar 221 for engaging a condenser in the workholder w. If the condenser is present, the switch SW3 will not be opened and the welding apparatus will operate. If the condenser is not present when its workholder is at the welding station, the switch SW3 will be opened by bar 216 so that the welder will not operate. Downward movement of lever 216 is limited by stop screw 225 carried by a post 226 supported by the plate 214.

Fig. 18, which is a sectional view on line 18—18 of Fig. 3, shows a cam 230 driven by shaft 161 engaging a roller 231 carried by a lever 232 pivoted at 233 in a bracket 234 carried by a channel 70 and urged clockwise (Fig. 18) by springs 235 (Fig. 17). A link 236 connects lever 232 with a lever 237 attached to a shaft 238 journaled in bearings 239 and 240 supported by the channel 70. Shaft 238 operates a lever 241. Lever 237 (Fig. 17) is connected by a link 242 with a lever 243 attached to a shaft 244 connected with a lever 245. A spring 243a tends to pull the levers 241 and 245 toward each other. Cam 230 operates to move them apart. These levers operate the condenser lead wire locating device at the welding station WS (Fig. 1).

The lead locating device comprises a bar 246 attached to the right (Fig. 18) conveyor rail 82 by screws 247 and spacers 248 and supporting condenser lead guide rods 249 which cause the condenser lead to be located about in the position 0 (Fig. 17). Each of the levers 241, 245 is connected by a link 250 with a pin 251 slidable along a slot 252 provided by bar 246. Each pin 251 carries a lever 253 having a wide, wire-gripping jaw 254. Springs 256a, connected, respectively, with pins 255 on links 250 and pins 256 on levers 253, urge said levers against rollers 257 pivoted on screws 258 attached to bar 246. Levers 253 have inclined surfaces 260 and horizontal (normally) surfaces 261 and 261', all engageable with rollers 257. When cam 230 pushes lever 232 right (Fig. 18), levers 253 are separated as shown in Fig. 17. When cam 230 allows lever 232 to move left by springs 235, said springs and also spring 243a cause levers 241, 245 and levers 253 to move up and together to cause their jaws to grip the wire lead at 0 to hold it in position for welding it to the clip at the welding station WS. As the condenser CT moves right in Fig. 17 to the welding station, its lead wire l is directed into the space directly above bars 246 by the inclined surfaces 246a and 249a of bars 246 and 249 respectively. The wire $l$ is therefore at a level to be gripped by jaws 254 which place the wire in position 0. When the lead wire is in position 0 the clip CT is in the position shown in Fig. 18 between the welding electrodes $e$ represented diagrammatically in Fig. 23. At the proper time, the upper electrode descends to engage the tang $c$ bent around the bare portion of lead wire $l$ and to press the terminal clip CT against the lower electrode and welding current is caused to pass to cause the tang $c$ to be welded to the bare portion of the lead wire.

The welder W is purchased equipment and its construction and mode of operation is well known to those skilled in the art of welding. The following is a brief description of the control of the welder.

Fig. 23 shows a diagram of electrical circuits other than those for the testing apparatus. Switch SW10 connects a three-phase A. C. source with a motor M1 which drives the conveyor B and the cam shaft 161, a motor M2 which causes the welder head to engage the work and a cam 700 to close a switch SW15, a motor M3 which operates conveyor BB (Fig. 1), a motor M4 for operating the punch press P, a welding circuit transformer WT, a transformer T2 for operating signal lamps L1, a transformer T3 for operating a relay CR1 controlling contacts CRP of a thyratrol control including tubes I and II for the welder, and a transformer T1. When switch SW16 is closed, a timer T11 is caused to operate. After a five minute interval or whatever time is required for tubes I and II to become heated for operation, contacts T11c close and lamp L2 burns and relay R1 is energized. Contacts R1C then close. Whenever switch SW15 is closed by the cam 700, relay CR1 is energized and its contacts CRP close and a circuit connection is made with one end of the primary of transformer WT. Tubes I and II automatically control the circuit connection with the other end of the primary of transformer WT so that welding current is applied at the proper instant in the welding operation.

If switch SW3 is closed when switch SW4X closes (by operation of cam 200), relay R2 is energized to cause its contacts R2C to close and the welder clutch solenoid S1 is energized to effect the tripping or closing of the one-cycle, automatically-releasing welder clutch. This clutch then connects the motor M4 with the mechanism which causes welding electrodes to engage the terminal clip and the wire to press them together while welding current passes in consequence of closing switch SW15 by cam 700 which is operated by said mechanism.

Switch SW17 connects 110 volts A. C. with the testing apparatus described in copending application, Serial No. 686,964.

The motors M1, M2, M3 and M4 are protected by manually-operated and by thermal-overload-release spring-opened switches SW11, SW12, SW13 and SW14, respectively.

While the embodiment of the present invention as herein disclosed, constitutes a preferred form, it is to be understood that other forms might be adopted.

What is claimed is as follows:

1. A machine for use in the manufacture of electric condensers having an insulated lead extending from an enclosing can, said machine comprising a conveyor having workholders, each retaining a condenser, an electric welder, a solenoid for controlling operation of the electric welder at a welding station for welding to the condenser leads a terminal clip previously assembled with the lead, means for feeling a condenser in the workholder at the welding station, a current source, a circuit for effecting connection of the solenoid with the current source and including two switches in series, one being under control by the feeler and remaining closed if a condenser is present in said workholder and a mechanism for causing operation of said feeler means and for causing the closing of the other switch to effect a cycle of welder operation if a condenser is present and then for causing operation of the conveyor.

2. In a machine for making an electrical device having a lead wire extending from the device and a terminal clip attached to the lead wire, the combination of a conveyor having workholders each for receiving a device, a welder positioned at a welding station along said conveyor, means for indexing the conveyor to move the devices successively to said welding station, bars between which the lead wire passes as the device moves to the welding station said bars having camming surfaces which direct the wire into a relatively narrow space between the bars, means for locating the wire when in said narrow space in a position such that its terminal clip will be located between electrodes of said welder, and mechanism for operating the conveyor indexing means and the lead wire locating means in timed relation.

JAMES S. BURGE.
FLOYD J. FOUST.
WILLARD C. SHAW.
WARREN M. RIDER.
HILTON J. McKEE.

References Cited in the file of this patent

UNITED STATES PATENTS

| Number | Name | Date |
|---|---|---|
| 1,361,652 | Wetmore | Dec. 7, 1920 |
| 1,622,792 | Languepin | Mar. 29, 1927 |
| 1,869,804 | Eksergian | Aug. 2, 1934 |
| 2,007,698 | Tear | July 9, 1935 |
| 2,078,694 | Smith | Apr. 27, 1937 |
| 2,338,002 | Mero | Dec. 28, 1943 |
| 2,345,965 | Elliott | Apr. 4, 1944 |
| 2,414,905 | Seltzer | Jan. 28, 1947 |
| 2,449,505 | Pito | Sept. 14, 1948 |
| 2,460,807 | Chanowitz | Feb. 8, 1949 |
| 2,477,859 | Burge et al. | Aug. 2, 1949 |